(12) United States Patent
Kondo

(10) Patent No.: US 11,836,071 B2
(45) Date of Patent: Dec. 5, 2023

(54) METHOD AND APPARATUS CREATING TEST ENVIRONMENTS FOR BLOCKCHAIN SYSTEMS

(71) Applicant: Hitachi, Ltd., Tokyo (JP)

(72) Inventor: Yuki Kondo, Santa Clara, CA (US)

(73) Assignee: Hitachi, Ltd., Tokyo (JP)

( * ) Notice: Subject to any disclaimer, the term of this patent is extended or adjusted under 35 U.S.C. 154(b) by 141 days.

(21) Appl. No.: 17/640,313

(22) PCT Filed: Dec. 10, 2019

(86) PCT No.: PCT/IB2019/060588
§ 371 (c)(1),
(2) Date: Mar. 3, 2022

(87) PCT Pub. No.: WO2021/116728
PCT Pub. Date: Jun. 17, 2021

(65) Prior Publication Data
US 2022/0334953 A1 Oct. 20, 2022

(51) Int. Cl.
*G06F 11/36* (2006.01)
*H04L 9/00* (2022.01)

(52) U.S. Cl.
CPC ........... *G06F 11/3684* (2013.01); *H04L 9/50* (2022.05)

(58) Field of Classification Search
CPC ............ G06F 11/3668; G06F 11/3672; G06F 11/3684; G06F 11/3696
(Continued)

(56) References Cited

U.S. PATENT DOCUMENTS 11,210,203 B2 * 12/2021 Jin ..................... G06F 11/3664
11,764,950 B2 *  9/2023 Padmanabhan ....... H04L 9/0822
                                                              707/827
(Continued)

FOREIGN PATENT DOCUMENTS

CN          108628745 A        10/2018
CN          112256577 A  *      1/2021
(Continued)

OTHER PUBLICATIONS

Membership Service Provider, Hyperledger Fabric Nyuumon 4, IBM, [online], Dec. 12, 2019 [retrieved on Mar. 4, 2020], Retrieved from the Internet:<URL: https://www.ibm.com/developerworks/jp/cloud/library/cl-hyperledger-fabric-basic-4/index.html>, non-official translation(Nishishita, Sui, Membership Service Provider, An introduction to Hyperledger Fabric Part 4, IBM).
(Continued)

*Primary Examiner* — Chae M Ko
(74) *Attorney, Agent, or Firm* — Procopio, Cory, Hargreaves & Savitch LLP

(57) ABSTRACT

Method and apparatus creating test environments for blockchain systems involving recreating system configurations and state database without block data to set up staging environments for blockchain systems. The example implementations involve a function getting the latest config block and database files of state database from a production environment. Further, there is a function extracting system configurations from the received latest config block, replacing root certifying authority certificate(s) in the system configurations with the certificate(s) for the staging environment, creating a system configuration transaction and sending the system configuration transaction to the staging environment to reflect the system configurations. Further, there is a function extracting a list of states from database files, creating a transaction request message having the list
(Continued)

of states and sending a transaction to the staging environment to load the states into the state database.

11 Claims, 12 Drawing Sheets

(58) Field of Classification Search
USPC .......................................................... 714/38.1
See application file for complete search history.

(56) References Cited

U.S. PATENT DOCUMENTS

| | | |
|---|---|---|
| 2016/0173286 A1 | 6/2016 | Gallagher |
| 2019/0149418 A1 | 5/2019 | Bertsche et al. |
| 2019/0238344 A1 | 8/2019 | Kaga et al. |
| 2019/0243737 A1 | 8/2019 | Savino et al. |
| 2019/0251018 A1* | 8/2019 | Jin ...................... G06F 11/3692 |
| 2020/0057565 A1* | 2/2020 | Sanghvi ................ G06F 3/0619 |
| 2020/0174912 A1* | 6/2020 | Sanghvi .............. G06F 11/3688 |

FOREIGN PATENT DOCUMENTS

| | | |
|---|---|---|
| WO | 2019040886 A1 | 2/2019 |
| WO | 2019072288 A2 | 4/2019 |

OTHER PUBLICATIONS

Office Action received in JP Patent Application No. 2022-512815, dated Feb. 7, 2023, in 5 pages, with English translation.
Ono, Shuji, "Effortless installation of secure application with Clickonce, You can create and try! Web Application Using Visual Web Developer Express, From Actual Application Creation to Atlas and ClickOnce Setting," Windows Developer Magazine, vol. 12, Issue 9, Jul. 1, 2006, Shoeisha, Inc., vol. 12, pp. 72-81, in 13 pages, with translation.
Extended European Search Report received in EP Patent Application No. 19956057.4, dated Aug. 30, 2023, in 9 pages.
Corda: "Corda Documentation master+Hyperledger", Apr. 17, 2018, pp. 1-318, XP055663417, Retrieved from the Internet: URL:https://buildmedia.readthedocs.org/media/pdf/corda/latest/corda.pdf [retrieved on Jan. 30, 2020].

* cited by examiner

```
header:
  number: 8
  previous_hash: f5353b2568b79cb5384b
  data_hash: 99cb3cbd1b545063f018
data:
  signature: 889jg34k48235jcss3
  config:
    version: 3
    values:
      root_ certs:
        - name: Org1
          root_certs: Ck1 JSUNRekNDQWVxZO
        - name: Org2
          root_ certs: ZJQOFURSOtLSOtCk1JCk
        - name: Org3
          root_ certs: ZOISQU5Pb1llbk9s1JSUN
      ConsensusType: RAFT
      BatchSize: 500
      BatchTimeout: 2s
      ...
```

FIG. 6(b)

```
header:
 type: Configuration Update
 transactionID: 84015929d0saf
 timestamp: 8939099988838
payload:
 signatures:
  - 890473qdafds0425
config:
 version: 3
 values:
  root_certs:
  - name: Org1
    root_certs: 6ajBFQXdJd2N6RUwKTt
  - name: Org2
    root_certs: 1 llbk9seU94dTJxZFBteSt
  - name: Org3
    root_certs: 293Q2dZSUtvWkl6ajBFQ
  ConsensusType: RAFT
  BatchSize: 500
  BatchTimeout: 2s
  ...
```

FIG. 6(c)

```
smartContractID: myAsset
State:
 - Key: asseto 1
   Value: John, yellow, 200
 - Key: asseto2
   Value: Keith, blue, 100
 - Key: asseto3
   Value: Jah, black, 300
```

FIG. 7(b)

```
request:
  smartContractID: myAsset
  functionName: loadStatesToStagingEnv
  args: [[asseto1, John, yellow, 200], [asseto2, Keith, blue, 100], [asseto3, Jah, black, 300]]
```

FIG. 7(c)

METHOD AND APPARATUS CREATING TEST ENVIRONMENTS FOR BLOCKCHAIN SYSTEMS

BACKGROUND

Field

The present disclosure is generally directed to blockchain systems, and more specifically, for methods and apparatuses for creating testing environments for block chain systems.

Related Art

In the related art, there are systems involving a distributed ledger having snapshots. Such related art implementations involve generating a snapshot of a distributed ledger at a particular point in time to facilitate point-in-time node restarts. Distributed ledger provides immutable records of transactions. The data volume can become large over time.

When adding a new node to the distributed ledger, the new node must read through all transactions to determine the current state of each element in the ledger. When there are many transactions in the ledger, it can take a large amount of time to read all transactions, and a large amount of storage is required to facilitate such operations. Related art implementations address the above problem by generating a snapshot of the distributed ledger at a particular point in time, writing the snapshot to a segment data file and a ledger, and restarting a node by using the snapshot.

SUMMARY

In contrast to the related art implementations, the example implementations described herein are directed to generating a snapshot of blockchain systems to set up a staging environment, and modifying a snapshot of blockchain systems to create test data for the staging environment.

Aspects of the present disclosure involve a method for managing a staging environment for a blockchain system deployed on a production environment, the method involving, responsive to a request to generate the staging environment for the blockchain system, obtaining data from the blockchain system executing on the production environment; recreating a system configuration of the blockchain system in the staging environment based on the obtained data; replacing root certificates in the system configuration with thea dummy root certificates for the staging environment; and recreating a state database of the blockchain system in the staging environment based on the obtained data.

Aspects of the present disclosure involve a computer program storing instructions for managing a staging environment for a blockchain system deployed on a production environment, the instructions involving, responsive to a request to generate the staging environment for the blockchain system, obtaining data from the blockchain system executing on the production environment; recreating a system configuration of the blockchain system in the staging environment based on the obtained data; replacing root certificates in the system configuration with thea dummy root certificates for the staging environment; and recreating a state database of the blockchain system in the staging environment based on the obtained data. The computer program and instructions may be stored on a non-transitory computer readable medium and configured to be executed by one or more processors.

Aspects of the present disclosure involve a system for managing a staging environment for a blockchain system deployed on a production environment, the system involving, responsive to a request to generate the staging environment for the blockchain system, means for obtaining data from the blockchain system executing on the production environment; means for recreating a system configuration of the blockchain system in the staging environment based on the obtained data; means for replacing root certificates in the system configuration with thea dummy root certificates for the staging environment; and means for recreating a state database of the blockchain system in the staging environment based on the obtained data.

Aspects of the present disclosure involve, an apparatus configured to manage a staging environment for a blockchain system deployed on a production environment, the apparatus involving a processor, configured to, responsive to a request to generate the staging environment for the blockchain system, obtain data from the blockchain system executing on the production environment; replace root certificates in the system configuration with thea dummy root certificates for the staging environment; recreate a system configuration of the blockchain system in the staging environment based on the obtained data; and recreate a state database of the blockchain system in the staging environment based on the obtained data.

BRIEF DESCRIPTION OF DRAWINGS

FIGS. 6(a) to 6(c) illustrates aspects for recreating the system configuration, in accordance with an example implementation.

FIGS. 7(a) to 7(c) illustrate aspects for recreating the state database, in accordance with an example implementation.

DETAILED DESCRIPTION

Figure 1:
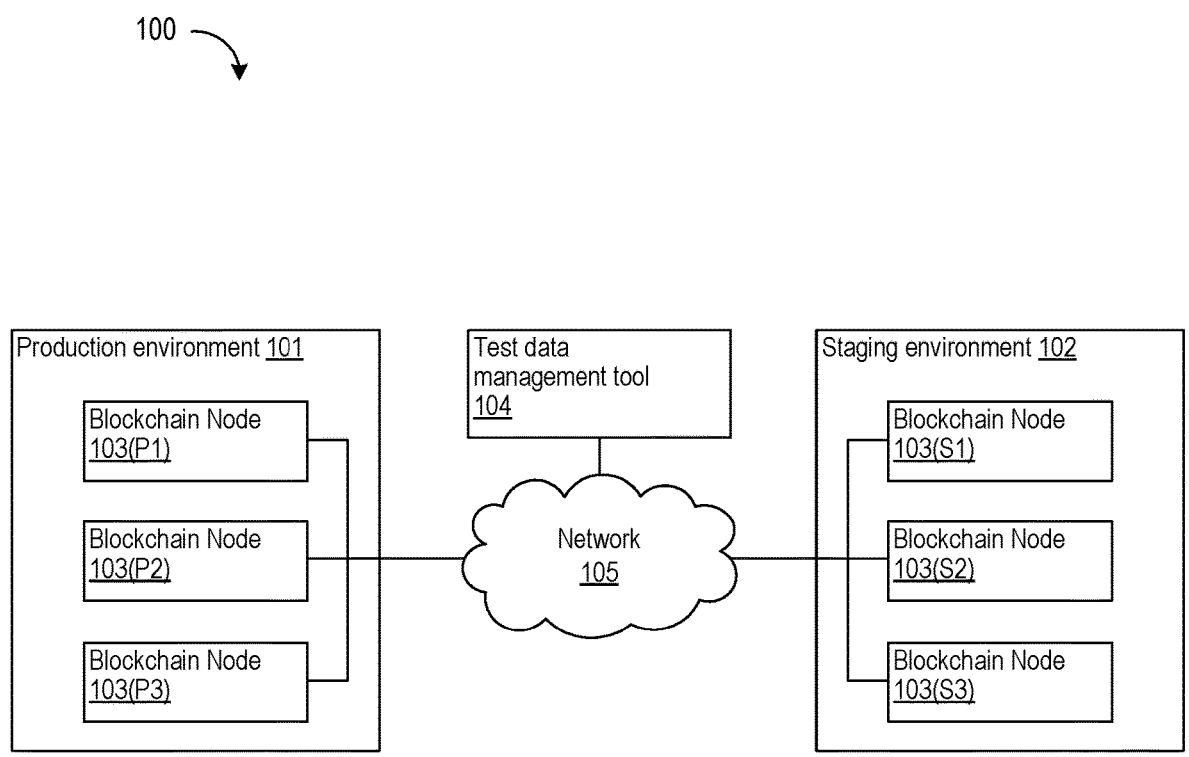
FIG. 1 illustrates an example system architecture of a blockchain system, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Blockchain is a database that is distributed and shared among the nodes participating in a network, and functions as an append-only database. As the name of blockchain shows, blockchain involves of a chain of blocks, wherein each block contains a list of transactions. Each block is linked to the previous block with a cryptographic hash. The nodes maintain the state of blockchain and execute transactions to modify the state. Blockchain is also known as distributed ledger technology.

A blockchain system involves multiple nodes operated by different organizations which do not fully trust each other. All nodes in a blockchain network agree on the content of transactions and the order of transactions stored in blocks. The mechanism for agreement is known as a consensus algorithm. There are various consensus algorithms. For example, various cryptocurrencies use Proof-of-Work (PoW), which makes nodes execute computationally expensive mathematical operations during consensus in public network. When nodes are authenticated in a closed private network, fault-tolerant consensus protocol like Raft, Paxos and PBFT are used.

Once a new block is created, the block is broadcasted to all nodes in the blockchain network. The nodes validate the block and transactions in the block before adding the block to the blockchain. Although the validation logic depends on the blockchain platform software, the standard validation rule is the verification of the digital signature. A transaction includes a digital signature of a requester, wherein a blockchain node verifies if the transaction is signed by a valid requester. When adding a new node to the blockchain network, the node receives previous blocks from other nodes. After that, the node verifies previous blocks and transactions which are transferred from other nodes.

Financial institutions and other companies have been developing blockchain applications, with the expectation that blockchain will transform their business process and create new services. The benefit of blockchain is decentralized governance, immutability and transparency. In a blockchain network, each node executes the same transaction and has the same state. It is possible to facilitate transactions without the privileged third party. Data on blockchain is immutable because the chain of hash prevents the transaction history from being changed. Since distributed data maintains transparency between stakeholders, blockchain reduces the cost of communication and audit beyond organizations.

Continuous Integration (CI) and Continuous delivery (CD) are a software development practice in which code changes are prepared for a release in short cycles, usually with a high degree of automation. The purpose is to make feedback loops as short as possible to improve software quality.

In CI/CD, automated builds, tests and staging deployments are integrated into one continuous process. Every code change is built, tested, and then pushed to a staging environment. In the staging environment, there are multiple tests such as user interface (UI) testing, integration testing, performance testing, load testing and reliability testing before a production network. To automate the process, CI/CD tools are used in development teams.

A staging environment is an environment that resembles a production environment as much as possible. The purpose of a staging environment is to test all of the installation/configuration/migration scripts and procedures before they are applied to a production environment. Another purpose is to test a system with real business data in terms of functionality and non-functionality.

General staging environments involve an application, system configurations and data. These components should be the same as the production environment. The application is pulled from a source code management system. To set up the system configurations and data, one standard method involves copying the entire data from the production environment to the staging environment.

For blockchain systems, some types of tests are executed in the staging environment. The test types include functionality test, system test, upgrade test and compatibility test. The functionality test verifies whether the functionalities of a system behave as designed. The system test verifies non-functionalities aspects of the system such as performance, availability and recovery. The upgrade test ensures that all upgrades to the environment ends successfully. The example cases are upgrading a smart contract (i.e. blockchain application), adding an organization to the blockchain, upgrading system configurations of the blockchain, and upgrading the version of blockchain platform software. The compatibility test verifies whether the upgraded smart contract can get and put states created by the previous versions of smart contracts.

To run these such types of tests, the staging environment should be the same as the production environment. The staging environment for blockchain systems should have organizations, network topology, system configurations, application, data, and digital certificates/keys. The organization structure should be the same as the production environment. The number of nodes should be same as the production environment. System configurations should be same as the production environment. The application should be the one scheduled to be deployed to the production environment after the test. The data should be as same as the production environment. The digital certificates and keys can be dummy certificates/keys for testing purposes.

To separate the consensus on transactions between the production environment and the staging environment, dummy digital certificates and keys are used in the staging environment. Blockchain systems use digital certificates and keys to verify transactions. Putting a digital signature to a transaction means that an organization consents to the business transaction in the production environment. In the staging environment, transactions are executed for tests. Since these transactions are not real business transactions, they do not need the consent of each organization. To make the boundary clear, dummy certificates and keys are used for the tests.

To prepare data for the staging environment, the standard method involves copying data from the production environment. However, it is not possible to copy data from the production environment to the staging environment for blockchain systems.

Blockchain systems have two types of data: block and state. A block contains a list of transactions. The state represents the latest values for all keys included in the transactions. When a new node joins a blockchain network, the node receives blocks from other nodes in the blockchain network to catch up the latest block. After receiving a block, the node verifies the digital signatures in the block. If the verification passes, the block is committed to the ledger. When committing a block, the state is also updated according to the transactions in the block. By repeating this process, a node can catch up to the latest state. This mechanism works well as long as the nodes exist in the same blockchain network.

For the staging environment, it is not possible to copy blocks from the production environment and commit blocks because the validating of the transactions will fail. If a peer node in the staging environment receives a block from the production environment, the node attempts to catch up to the latest block and create a state. The staging environment utilizes dummy cryptographic materials (i.e. digital certificates and private keys) which are different from the production environment. As a result, the node will fail to validate transactions copied from the production environment because the identities do not match the ones in the staging blockchain network. Since those transactions are evaluated as invalid, nothing is committed to the block and the state is not updated. Therefore, the general approach to create data in the staging environment does not work for the blockchain systems.

Example implementations described herein address the above problem as follows. The example implementation utilizes implementations directed to recreating system configurations and the state database without the block data to set up the staging environments for blockchain systems. Such implementations involve, responsive to a request to generate the staging environment for the blockchain system, a function obtaining data (e.g., the latest configuration (config) block and database files of a state database) from the blockchain system executing on a production environment. The example implementations involve a function recreating a system configuration of the blockchain system in the staging environment based on the obtained data (e.g., extracting system configurations from the received latest config block), replacing root certificate authority (CA) certificate(s) in the system configurations with the dummy root certificate(s) for the staging environment, and recreating a state database of the blockchain system in the staging environment based on the obtained data. Such recreations can involve creating a system configuration transaction and sending the system configuration transaction to the staging environment to reflect the system configurations. The example implementations also involve a function extracting a list of states from database files, creating a transaction request message having the list of states and sending a transaction to the staging environment to load the states into the state database.

The main concept is recreating the minimum necessary data for tests in the staging environment. As mentioned above, the staging environment for blockchain systems are used for functionality test, system test, upgrade test and compatibility test. This invention focuses on these major test types.

For the test types above, the staging environment should have the same system configurations and state database as the production environment. The same system configurations are used to verify if the upgrading operations work successfully on the current environment before applying them to the production environment. The same state database is required to evaluate if the upgraded smart contract (i.e. blockchain application) work well by getting and putting the states created by the previous versions of smart contracts. On the other hand, block data is not used in these test types because smart contracts do not access to the block data directly.

Example implementations described herein involve recreating system configurations and the state database for the staging environment without block data. Block data is discarded because the block data is not necessary for tests in the staging environment. Further, blocks copied from the production environments prevent recreation of the state database in the staging environment due to the transaction validation process. Thus, example implementations described herein recreate the state database through other methods.

First, example implementations obtain the latest config block and database files of state database from the production environment. The latest config block is used to recreate system configurations later. Database files are used to recreate state database in the staging environment. Other data in the production environment is not copied.

Next, example implementations described herein recreate system configurations for the staging environment. The latest config block contains a set of system configurations. The method purses the config block and extracts system configurations. The system configurations include the root CA certificate(s) of organizations in the production environment. If these system configurations are applied to the staging environment without modification, the system configuration transaction will fail. The reason is that blockchain nodes in the staging environment use the dummy digital certifications and private keys. To pass the validation, example implementations replace the root CA certificate(s) in the system configuration with the dummy one(s) for the staging environment. After that, the example implementations create a system configuration transaction and send it to the staging environment. When the transaction is committed, the staging environment has the same system configurations as the production environment except for the digital certifications.

Next, the example implementations recreate the state database in the staging environment. The database files of state database contain a set of key-value states. The example implementations described herein purse the database files and extract the latest states. Other data such as index information and transaction history are discarded because test types in scope require only the current states. To load the extracted states, the example implementations create a transaction request message including the list of states and sends it to the staging environment. When the transaction is committed, the staging environment has the same state as the production environment.

Since block data is not copied from the production environment to the staging environment, some types of tests involving block data may not be available. For example, audit function becomes out of scope as it checks the transaction history and digital signature in the block data. Instead of discarding such test types, example implementations facilitate the majority test cases and create a staging environment efficiently.

FIG. 1 illustrates an example system architecture of a blockchain system, in accordance with an example implementation.

System 100 has a production environment 101, a staging environment 102 and a test data management tool 104. Production environment 101 has blockchain node(s) 103 (P1)-(P3). Staging environment 102 has blockchain node(s) 103(S1)-(S3). All components are connected though network 105. Test data management tool 104 accesses blockchain node(s) 103 in the production environment 101 and staging environment 102 via network 105. In an example implementation, blockchain node(s) 103 are owned by different organizations.

Production environment 101 is used for business operations. On the other hand, staging environment 102 is used for tests before deploying the artifacts to the production environment 101.

Figure 2:
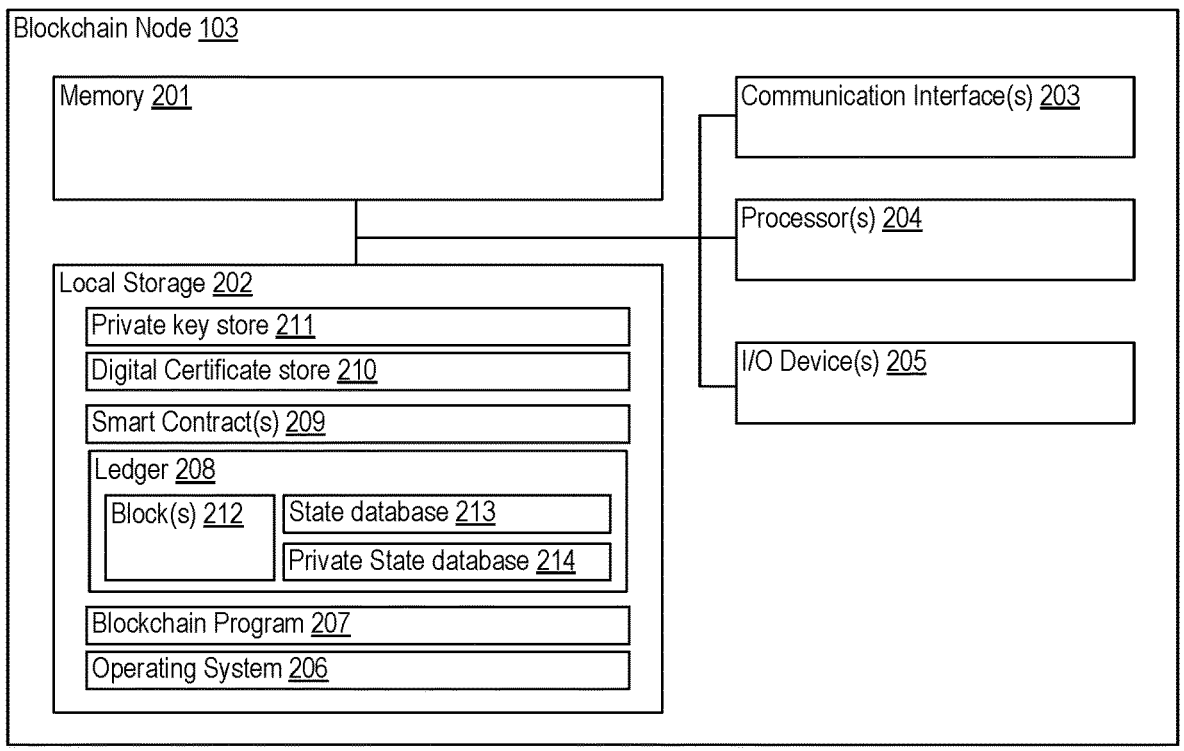
FIG. 2 illustrates an example physical configuration of blockchain node, in accordance with an example implementation.

FIG. 2 illustrates an example physical configuration of blockchain node 103, in accordance with an example implementation. Blockchain node 103 involves memory 201, local storage 202, communication interface(s) 203, processor(s) 204 and Input/Output (I/O) Devices(s) 205. Local storage 202 contains operating system 206, blockchain program 207, ledger 208, smart contract(s) 209, digital certificate store 210 and private key store 211. Ledger 208 has block(s) 212, state database 213 and private state database 214. Processor(s) 204 can be in the form of a physical hardware such as Central Processing Unit(s) (CPUs) or any combination of hardware and software processors in accordance with the desired implementation.

Blockchain program 207 is a platform software providing the infrastructure of a blockchain system. Smart contract(s) 209 is a blockchain application program to request executing transactions within a blockchain system.

The request is processed by blockchain program 207. When blockchain program 207 validates transactions, it uses digital certificates in digital certificate store 210 and private keys in private key store 211 respectively. After the validation, blockchain program 207 stores transactions in block(s) 212. State database 213 is also updated to represent the latest values for all keys included in the transactions stored in block(s) 212. System configurations of a blockchain system are stored as a block data. When upgrading system configurations, a system configuration transaction is executed, and the upgraded configurations are put into a block 212.

A blockchain system is operated by multiple organizations. Each organization has its own blockchain node(s) 103. Although the structure of blockchain node(s) 103 are same among the all organization, each organization's node(s) has different certificates and private keys to identify each organization. In addition, certificates and private keys are different between production environment 101 and staging environment 102.

In some cases, some of the organizations have private data between them. Only the designated organizations should have the private data, and the other organizations should not have the private data. For restricting the scope of data sharing, the private data is not stored in state database 213 but in private state database 214. Private state database 214 involves a private data area for each organization. According to the privacy policy between organizations, blockchain node(s) 103 for each organization have different data in the private state database 214.

Figure 3:
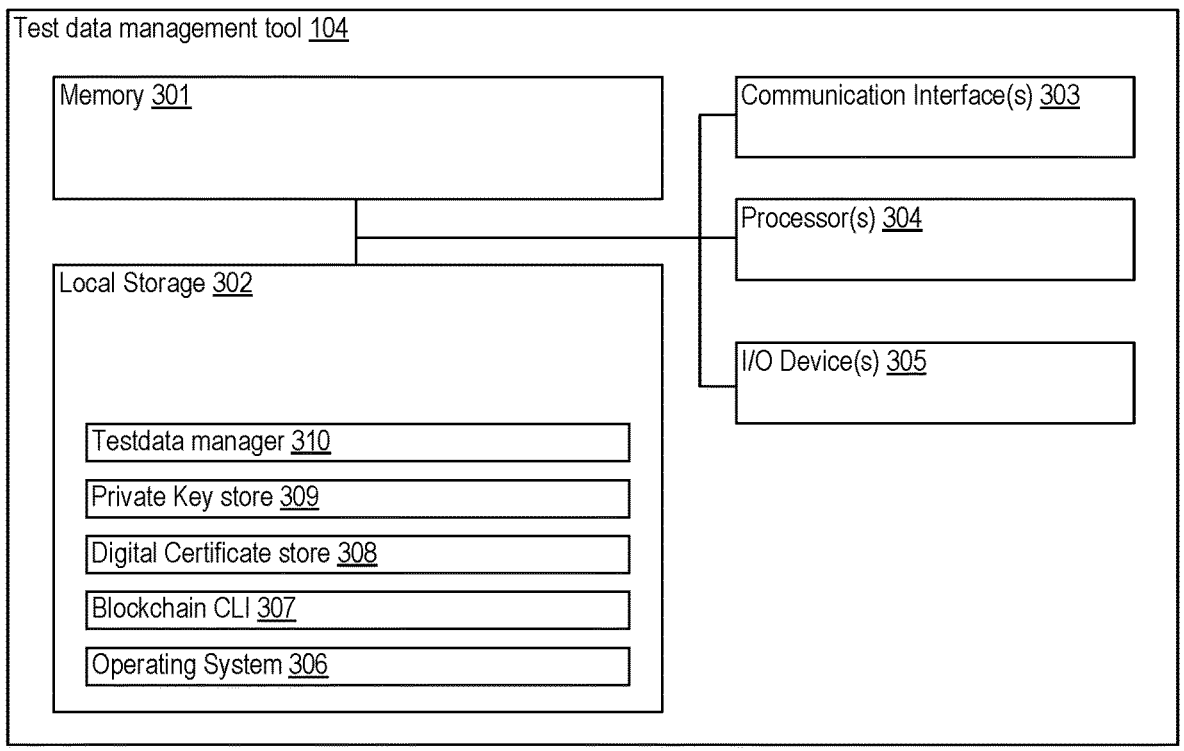
FIG. 3 illustrates an example physical configuration of test data management tool, in accordance with an example implementation.

FIG. 3 illustrates an example physical configuration of test data management tool 104, in accordance with an example implementation. Test data management tool 104 involves memory 301, local storage 302, communication interface(s) 303, processor(s) 304 and I/O Devices(s) 305. Local storage 302 contains operating system 306, blockchain command line interface (CLI) 307, digital certificate store 308, private key store 309, and test data manager 310. Processor(s) 304 can be in the form of a physical hardware such as Central Processing Unit(s) (CPUs) or any combination of hardware and software processors in accordance with the desired implementation.

Blockchain CLI 307 has a set of commands to interact with the blockchain node(s) 103. Blockchain CLI 307 is used when sending a transaction to the blockchain network or running operations to the blockchain network.

Digital certificate store 308 contains digital certificates used in the production environment 101 and the staging environment 102. Private key store 309 contains private keys used in the staging environment 102.

Test data manager 310 is a program to recreate the system configuration and state database in the staging environment.

As will be described herein, test data management tool 104 is configured to manage a staging environment 102 for a blockchain system deployed on a production environment as illustrated in FIG. 1. In response to a request to generate the staging environment for the blockchain system as illustrated at 402 of FIG. 4, processor(s) 304 can be configured to obtain data from the blockchain system executing on the production environment as illustrated at 403 in FIG. 4; recreate a system configuration of the blockchain system in the staging environment based on the obtained data as illustrated at 404 of FIG. 4; and recreate a state database of the blockchain system in the staging environment based on the obtained data as illustrated at 405 of FIG. 4.

Figure 4:
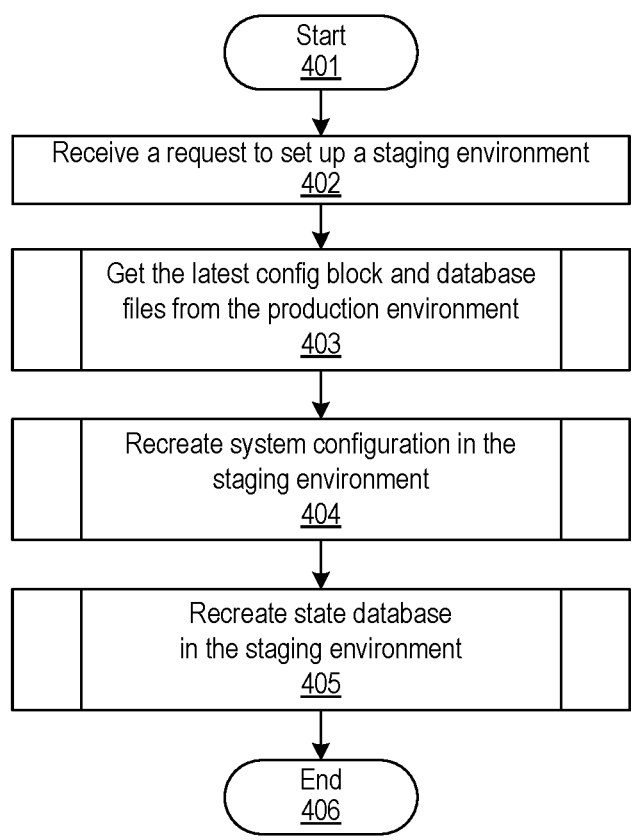
FIG. 4 is a flow diagram illustrating an example process of test data manager, in accordance with an example implementation.
Figure 6A:
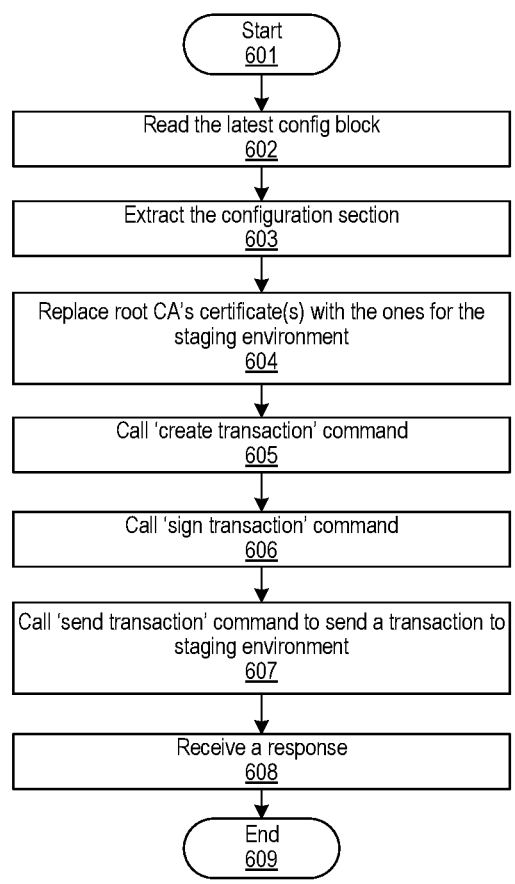

As an example and as illustrated at 403 of FIG. 4, such data can include a latest config block of the blockchain system, and processor(s) 304 can be configured to recreate the system configuration of the blockchain system in the staging environment based on the obtained data by extracting system configurations from the latest config block as illustrated at 603 of FIG. 6(a); generating a system configuration transaction from the extracted system configurations as illustrated at 605 to 606 of FIG. 6(a); and transmitting the system configuration transaction in the staging environment for execution as illustrated at 607 of FIG. 6(a).

Figure 7A:
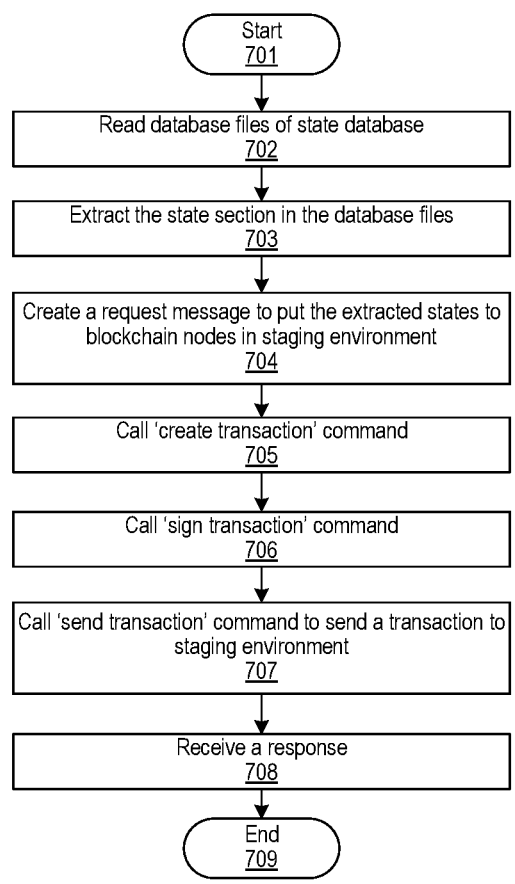

As another example and as illustrated at 403 of FIG. 4, such data can also involve a plurality of database files of a state database of the blockchain system, and processor(s) 304 can be configured to recreate the state database of the blockchain system in the staging environment based on the obtained data by extracting latest states of the blockchain system from the database files as illustrated at 703 of FIG. 7(a); generating a transaction with the latest states as illustrated at 704-706 of FIG. 7(a); and transmitting the transaction to the staging environment for execution as illustrated at 707 of FIG. 7(a). As illustrated in FIG. 7(a), processor(s) 304 can be configured to generate a request message to place the latest states of the blockchain system into blockchain nodes in the staging environment as illustrated at 704, and generate and sign a transaction based on the request message as illustrated at 705 and 706 of FIG. 7(a).

Processor(s) 304 can be configured to recreate the system configuration of the blockchain system in the staging environment based on the obtained data by providing dummy keys to replace root certificates of the blockchain system for the staging environment as illustrated at 604 of FIG. 6(a). In example implementations, the dummy keys can be created by the user through any methods known to one of ordinary skill in the art in accordance with the desired implementation, or can be generated through a key generator.

In some examples as described herein, there is a need to duplicate some or all of the aspects of the organizations of the blockchain system including their corresponding private state database. In such example implementations, the data can involve database files from the private databases of the one or more organizations being tested in the staging environment, and processor(s) 304 can be configured to retrieve the database files from a corresponding private state database of each of the one or more organizations; and recreate, in the staging environment, each of the one or more organizations and the corresponding private state database for the each of the one or more organizations in the staging environment based on the database files as illustrated in FIG. 5.

FIG. 4 is a flow diagram illustrating an example process of test data manager 310, in accordance with an example implementation. The process begins at 401. At 402, the test data manager 310 receives a request to set up a staging environment. At 403, the test data manager 310 gets the latest config block and database files from the production environment. The detailed procedure of this process is described in further detail at FIG. 5.

At 404, the test data manager 310 recreates system configuration in the staging environment. The detailed procedure of this process is described in further detail at FIGS. 6(a) to 6(c). At 405, the test data manager 310 recreates state database in the staging environment. The detailed procedure of this process is described in further detail at FIG. 7. At 406, the test data manager 310 ends the process.

Figure 5:
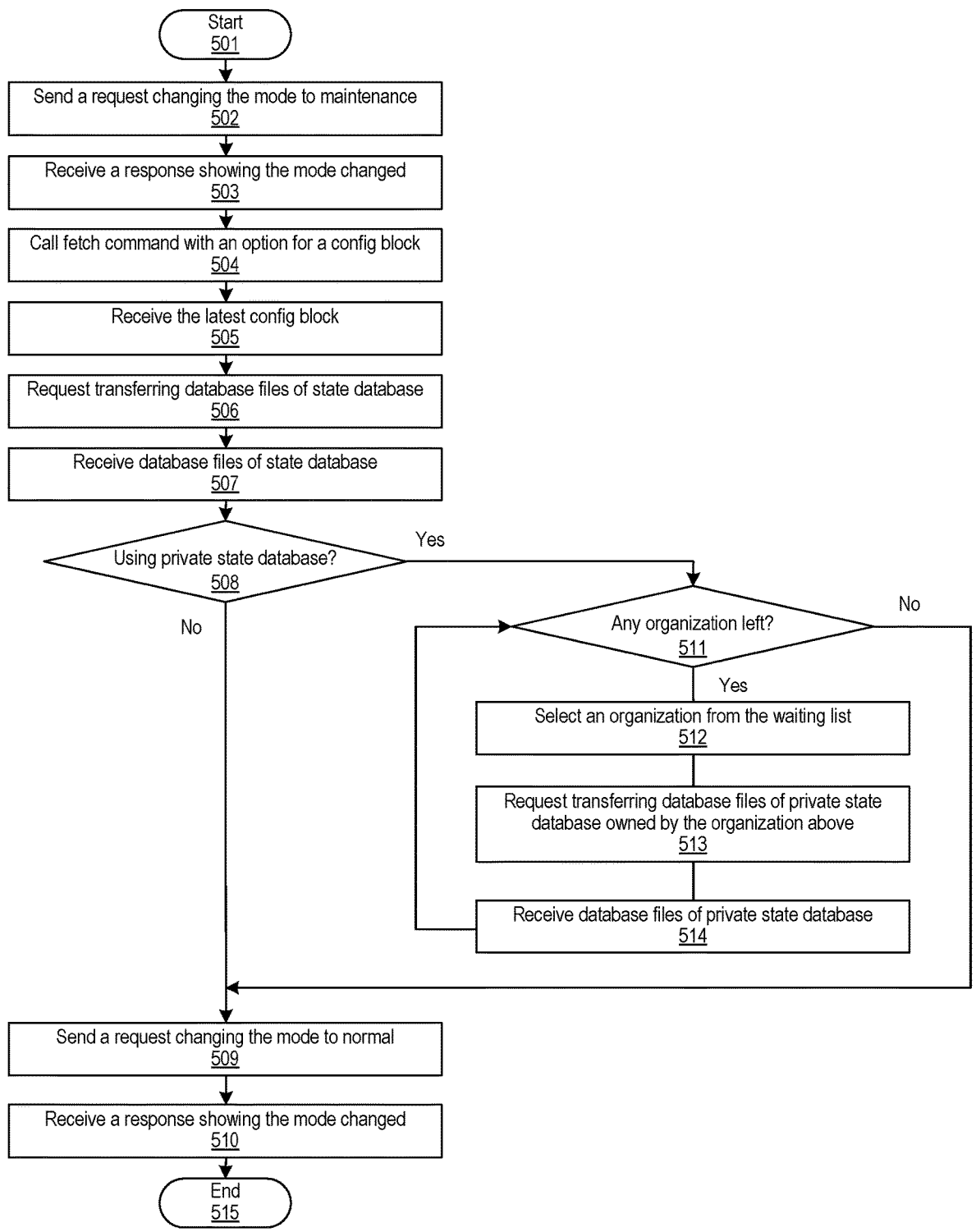
FIG. 5 illustrates a flow diagram for getting data from the production environment, in accordance with an example implementation.

FIG. 5 illustrates a flow diagram for getting data from the production environment, in accordance with an example implementation. Specifically, FIG. 5 is a flow diagram illustrating an example process 403 in FIG. 4. The flow at 403 gets data from the production environment 101 to test data management tool 104. The test data manager 310 starts the flow at 501. At 502, the test data manager 310 sends a request message for changing the production environment 101 to the maintenance mode. The request message is sent to blockchain node(s) 103 in the production environment 101.

At 503, the test data manager 310 receives a response message from blockchain node(s) 103 in the production environment 101. The response message shows that the production environment 101 has changed to maintenance mode. During the maintenance mode, production environment 101 does not receive new transactions.

At 504, the test data manager 310 calls 'fetch block' command of blockchain CLI 307. The command is executed with the option to get a config block. The command is sent to blockchain node(s) 103 in the production environment 101. When blockchain node(s) receive a fetch command with the option for a config block, the blockchain node(s) return the latest config block in the environment.

At 505, the test data manager 310 receives a response from blockchain CLI 307 and gets a file of a config block. The returned config block contains the system configurations in the production environment 101.

At 506, the test data manager 310 requests the transferring of database files of the state database 213. Test data manager 310 calls a remote copy command of operating system 306. The remote copy command is executed with arguments to transfer database files of state database 213. The copy command is sent to blockchain node(s) 103 in the production environment 101.

At 507, the test data manager 310 receives a response from operating system 306 and obtains database files of the state database 213. The returned database files contain the state data in the production environment 101.

At 508, the test data manager 310 checks if the blockchain network uses the private state database 214. As described, private state database 214 is a private data area for each organization. According to the privacy policy between organizations, each organization's blockchain node(s) 103 has different data in the private state database 214. To recreate the same private data in the staging environment 102, database files of the private state database 214 needs to be transferred from the production environment 101 per organization. If private state database 214 is not to be used (No), then the process proceeds to 509, and there is no need to run processes for private state database 214.

If private state database 214 is to be used (Yes), then the process proceeds to 511. The processes at 511-514 are processes for getting database files of private state database 214. These additional processes make it possible to create a staging environment 102 which has the same private data as the production environment 101.

At 509, the test data manager 310 sends a request message for changing the production environment 101 to the normal mode. The request message is sent to blockchain node(s) 103 in the production environment 101. At 510, the test data manager 310 receives a response message from blockchain node(s) 103 in the production environment 101. The response message shows that the production environment 101 has changed to normal mode. After changing to the normal mode, production environment 101 receives and executes new transactions.

At 511, the test data manager 310 checks if database files of private state database 214 are transferred from all organizations. If any organization is left (Yes), the process proceeds to 512, otherwise (No) the process proceeds to 509.

At 512, the test data manager 310 selects an organization from the waiting list. At 513, the test data manager 310 requests transferring database files of private state database 214 owned by the organization selected in the process at 512. Test data manager 310 calls a remote copy command of operating system 306. The remote copy command is executed with arguments to transfer database files of private state database 214. The copy command is sent to blockchain node(s) 103 owned by the designated organization in the production environment 101.

At 514, the test data manager 310 receives a response from operating system 306 and gets database files of private state database 214 owned by the designated organization. The returned database files contain the private state data in the production environment 101. At 515, the test data manager 310 ends the process.

FIGS. 6(a) to 6(c) illustrate aspects for recreating the system configuration, in accordance with an example implementation. Specifically, FIG. 6(a) is a flow diagram illustrating an example of the process 404 of FIG. 4. The process at 404 recreates the system configuration for the staging environment 102. The test data manager 310 starts this process at 601. At 602, the test data manager 310 reads the latest config block fetched from the production environment 101.

An example data structure of a config block is illustrated in FIG. 6(b). As illustrated in FIG. 6(b), the config block has a header section and a data section. The header section contains metadata such as the block number, previous hash of the block and data hash of the block. Under the data section, there is the signature and the config. The signature field is a digital signature set by the creator of this configuration block. Under the config section, there is the version and related values. The values have actual system configurations such as consensus type, batch size and batch timeout. The root certs field has root CA certificate(s) of organizations joining the blockchain network.

At 603, the test data manager 310 extracts the configuration section from the config block.

At 604, the test data manager 310 replaces root CA certificate(s) in the configuration section with ones for the staging environment. The root CA certificate(s) for staging environment is retrieved from the digital certificate store 308.

At 605, the test data manager 310 calls the 'create transaction' command of Blockchain CLI 307. The command is executed with the arguments to assign a data format for the configuration transaction and read the configuration data modified in the process at 604. When the command is executed, a new system configuration transaction is created.

At 606, the test data manager 310 calls the 'sign transaction' command of blockchain CLI 307. The command is executed with the argument to read the configuration transaction created in the process at 605. When the command is executed, the digital signature(s) are put to the system configuration transaction. The digital signatures are signed with dummy private key(s) for staging environment 102.

An example data structure of a signed system configuration transaction is illustrated in FIG. 6(*c*). As illustrated in FIG. 6(*c*), the system configuration transaction includes a header and payload. The header section contains metadata such as type, transactionID and timestamp. The payload section has signatures and config. The signature field has digital signatures incorporated from the process at 606. The config field has systems configurations modified in the previous steps.

At 607, the test data manager 310 calls the 'send transaction' command of blockchain CLI 307. The command is executed with the argument to read the signed system configuration transaction in the process at 606. The command is sent to blockchain node(s) 103 in the staging environment 102. When blockchain node(s) receive a transaction, the blockchain node(s) execute the transaction and commit the configuration into the block. After that, the blockchain node(s) 103 work according to the updated configurations in the block.

At 608, the test data manager 310 receives a response from blockchain CLI 307. The response message shows that the posted system configuration transaction is committed to the blockchain node(s) 103 in the staging environment 102.

At 609, the test data manager 310 ends the process.

FIGS. 7(*a*) to 7(*c*) illustrate aspects for recreating the state database, in accordance with an example implementation. Specifically, FIG. 7(*a*) is a flow diagram illustrating an example of the process at 405 in FIG. 4. Process 405 recreates state database 213 in the staging environment 102. The test data manager 310 starts the process at 701.

At 702, the test data manager 310 reads database files of state database 213 transferred from the production environment 101 as retrieved from the process at 507.

At 703, the test data manager 310 extracts the state data 801 in the database files. The extracted data has multiple sets of keys and values. Other data such as index information 802 and transaction history 803 as will be shown in FIG. 8 are discarded because the scope of the test types only require the current states.

Figure 8:
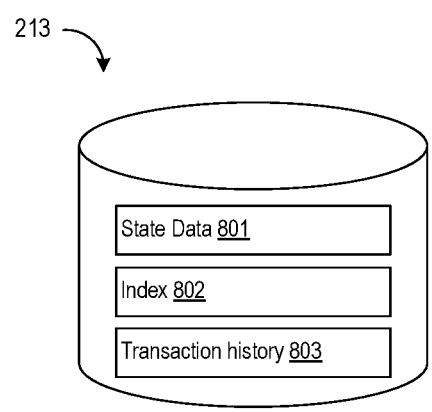
FIG. 8 illustrates an example data structure of state database, in accordance with an example implementation.

An example data structure of a state data 801 of FIG. 8 is illustrated in FIG. 7(*b*). As illustrated in FIG. 7(*b*), a state section has a contractID and a state section. The state section has multiple sets of keys and values. The key-value data shows the latest state in the blockchain network.

At 704, the test data manager 310 creates a request message to put the extracted states to blockchain node(s) 103 in staging environment 102. An example data structure of a request message is as follows. A request message has smartContractID, functionName and args. In blockchain network, smart contract(s) 209 is used to put states. The request message assigns a smart contract 209 called 'my Asset' to the smartContractID field and a function called 'loadStatesToStagingEnv' to the functionName field. The function 'loadStatesToStagingEnv' receive arrays of states as arguments. To put multiple sets of states extracted in the process of 703, the request message assigns those sets of states to the args field. The key is put to the first item in an array and the values are associated accordingly as illustrated in FIG. 7(*c*).

At 705, the test data manager 310 calls 'create transaction' command of blockchain CLI 307. The command is executed with arguments to assign a data format for a normal transaction and read the request message created in the process at 704. When the command is executed, a new transaction is created.

At 706, the test data manager 310 calls 'sign transaction' command of blockchain CLI 307. The command is executed with the argument to read the transaction created in the process at 705. When the command is executed, digital signature(s) are put to the transaction. The digital signature(s) is signed with dummy private key(s) for staging environment 102.

At 707, the test data manager 310 calls 'send transaction' command of blockchain CLI 307. The command is executed with the argument to read the signed transaction in the process at 706. The command is sent to blockchain node(s) 103 in the staging environment 102. When blockchain node(s) receive a transaction, the blockchain node(s) execute the transaction and commit the transaction into the block. While committing a block, the state database is also updated to reflect the change caused by the transaction. In this case, the transaction contains a request to put multiple sets of key-values extracted from the production environment 101. After committing the block, the blockchain node(s) 103 in the staging environment 102 has the same states as the production environment 101.

At 708, the test data manager 310 receives a response from blockchain CLI 307. The response message shows that the posted transaction is committed to the blockchain node(s) 103 in the staging environment 102.

At 709, the test data manager 310 ends the process.

FIG. 8 illustrates an example data structure of state database 213, in accordance with an example implementation. State database 213 has state data 801, index 802 and transaction history 803.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for managing a staging environment for a blockchain system deployed on a production environment, the method comprising:
    responsive to a request to generate the staging environment for the blockchain system:
        obtaining data from the blockchain system executing on the production environment;
        recreating a system configuration of the blockchain system in the staging environment based on the obtained data;
        replacing root certificates in the system configuration with dummy root certificates for the staging environment; and
        recreating a state database of the blockchain system in the staging environment based on the obtained data.

2. The method of claim 1, wherein the data comprises a latest config block of the blockchain system, and wherein the recreating the system configuration of the blockchain system in the staging environment based on the obtained data comprises:
    extracting system configurations from the latest config block;
    generating a system configuration transaction from the extracted system configurations; and
    transmitting the system configuration transaction in the staging environment for execution.

3. The method of claim 1, wherein the data comprises a plurality of database files of a state database of the blockchain system, wherein the recreating the state database of the blockchain system in the staging environment based on the obtained data comprises:
    extracting latest states of the blockchain system from the database files;
    generating a transaction comprising the latest states; and
    transmitting the transaction to the staging environment for execution.

4. The method of claim 3 further comprising:
    generating a request message to place the latest states of the blockchain system into blockchain nodes in the staging environment; and
    generating and signing a transaction based on the request message.

5. The method of claim 1, wherein the data comprises database files from one or more organizations, wherein the method further comprises:
    retrieving the database files from a corresponding private state database of each of the one or more organizations; and
    recreating, in the staging environment, each of the one or more organizations and the corresponding private state database for the each of the one or more organizations in the staging environment based on the database files.

6. A computer program storing instructions to execute a process for managing a staging environment for a blockchain system deployed on a production environment, the instructions comprising:
    responsive to a request to generate the staging environment for the blockchain system:
        obtaining data from the blockchain system executing on the production environment;
        recreating a system configuration of the blockchain system in the staging environment based on the obtained data;
        replacing root certificates in the system configuration with dummy root certificates for the staging environment; and
        recreating a state database of the blockchain system in the staging environment based on the obtained data.

7. The computer program of claim 6, wherein the data comprises a latest config block of the blockchain system, and wherein the recreating the system configuration of the blockchain system in the staging environment based on the obtained data comprises:
    extracting system configurations from the latest config block;
    generating a system configuration transaction from the extracted system configurations; and transmitting the system configuration transaction in the staging environment for execution.

8. The computer program of claim 6, wherein the data comprises a plurality of database files of a state database of the blockchain system, wherein the recreating the state database of the blockchain system in the staging environment based on the obtained data comprises:

extracting latest states of the blockchain system from the database files;

generating a transaction comprising the latest states; and transmitting the transaction to the staging environment for execution.

9. The computer program of claim 8, the instructions further comprising:

generating a request message to place the latest states of the blockchain system into blockchain nodes in the staging environment; and generating and signing a transaction based on the request message.

10. The computer program of claim 6, wherein the data comprises database files from one or more organizations, wherein the instructions further comprises:

retrieving the database files from a corresponding private state database of each of the one or more organizations; and recreating, in the staging environment, each of the one or more organizations and the corresponding private state database for the each of the one or more organizations in the staging environment based on the database files.

11. An apparatus configured to manage a staging environment for a blockchain system deployed on a production environment, the apparatus comprising:

a processor, configured to, responsive to a request to generate the staging environment for the blockchain system:

obtain data from the blockchain system executing on the production environment;

recreate a system configuration of the blockchain system in the staging environment based on the obtained data;

replace root certificates in the system configuration with dummy root certificates for the staging environment; and recreate a state database of the blockchain system in the staging environment based on the obtained data.

* * * * *